United States Patent [19]

Wilkinson

[11] Patent Number: 5,304,091
[45] Date of Patent: Apr. 19, 1994

[54] SELF-SPREADING GAMBREL FOR SUPPORTING SLAIN ANIMALS

[76] Inventor: David A. Wilkinson, 168 Kirk Dr., Newport News, Va. 23602

[21] Appl. No.: 24,376

[22] Filed: Mar. 1, 1993

[51] Int. Cl.[5] .............................................. A22C 15/00
[52] U.S. Cl. .................................... 452/192; 452/189
[58] Field of Search ................ 452/192, 187, 188, 189, 452/191

[56] References Cited

U.S. PATENT DOCUMENTS

| | | | |
|---|---|---|---|
| 1,172,489 | 2/1916 | Schellinger | 452/189 |
| 1,174,786 | 3/1916 | Wieland | 452/192 |
| 1,373,823 | 4/1921 | McClung | 452/191 |
| 1,485,161 | 2/1924 | Blake | 452/192 |
| 1,530,675 | 3/1925 | Janes | 452/192 |
| 2,093,732 | 9/1937 | Pawlitschek | 452/191 |
| 2,710,766 | 6/1955 | Erlewine | 452/192 |
| 3,894,313 | 7/1975 | Miller | 17/44 |
| 4,580,317 | 8/1986 | Timothy | 17/45 |
| 4,860,404 | 8/1989 | Flachs | 17/44 |
| 5,049,110 | 9/1991 | Owens | 452/187 |

FOREIGN PATENT DOCUMENTS 957748 2/1950 France ..................... 452/191

*Primary Examiner*—Willis Little
*Attorney, Agent, or Firm*—Rhodes & Ascolillo

[57] ABSTRACT

An adjustable frame member has one end of a first linking member pivotally connected to the adjustable frame member. A first abutting member is pivotally connected to another end of the first linking member and a first side frame member is attached to the first abutting member. A suspension member pivotally connects to the first side frame member and a second side frame member pivotally connects to the suspension member. A second abutting member attaches to the second side frame member and one end of a second linking member pivotally connects to the second abutting member. Another end of the second linking member pivotally connects to the adjustable frame member. A hanger adjustably connects to the adjustable frame member and there is a first adjustment device on the hanger. There is a second and a third adjustment device on the hanger. At least one first support is adjustably connected to an end of the first side frame member and at least one second support is adjustably connected to one end of the second side frame member to attach a slain animal.

4 Claims, 7 Drawing Sheets

FIG. 5
FIG. 6
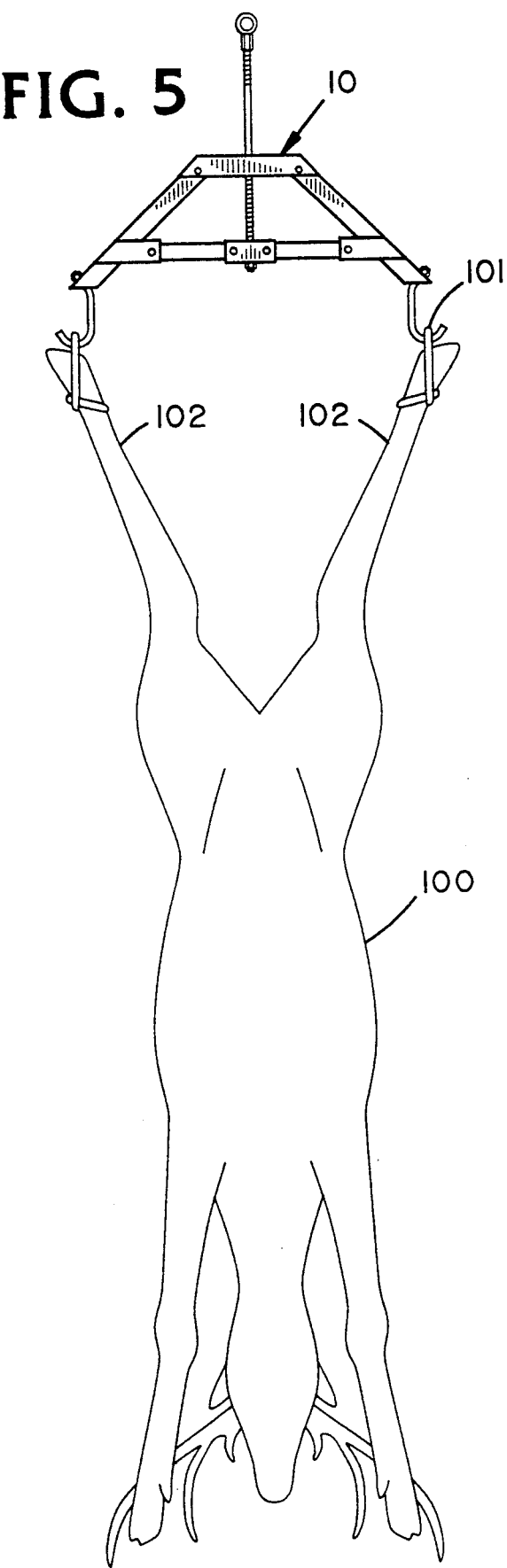
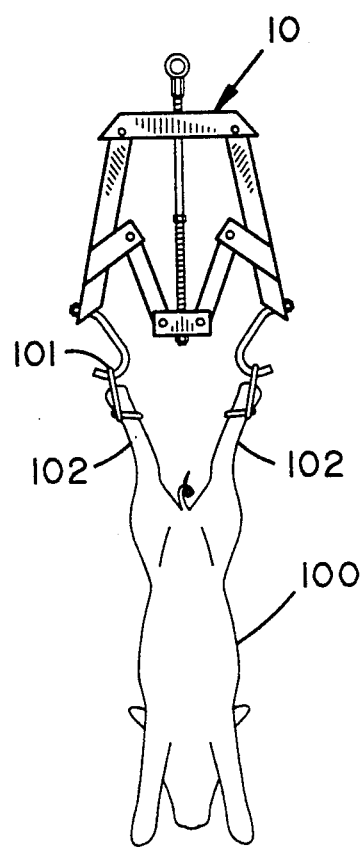

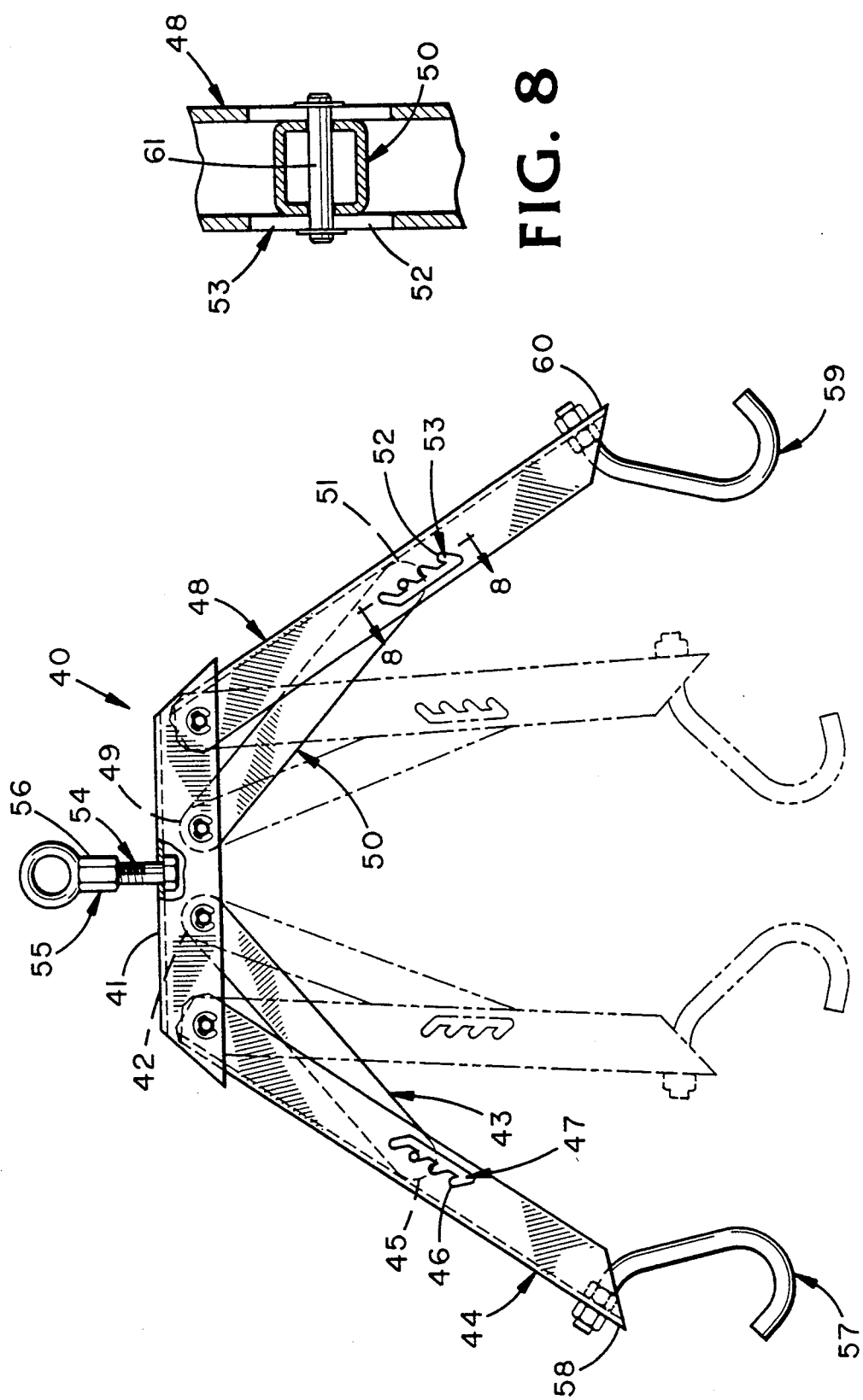

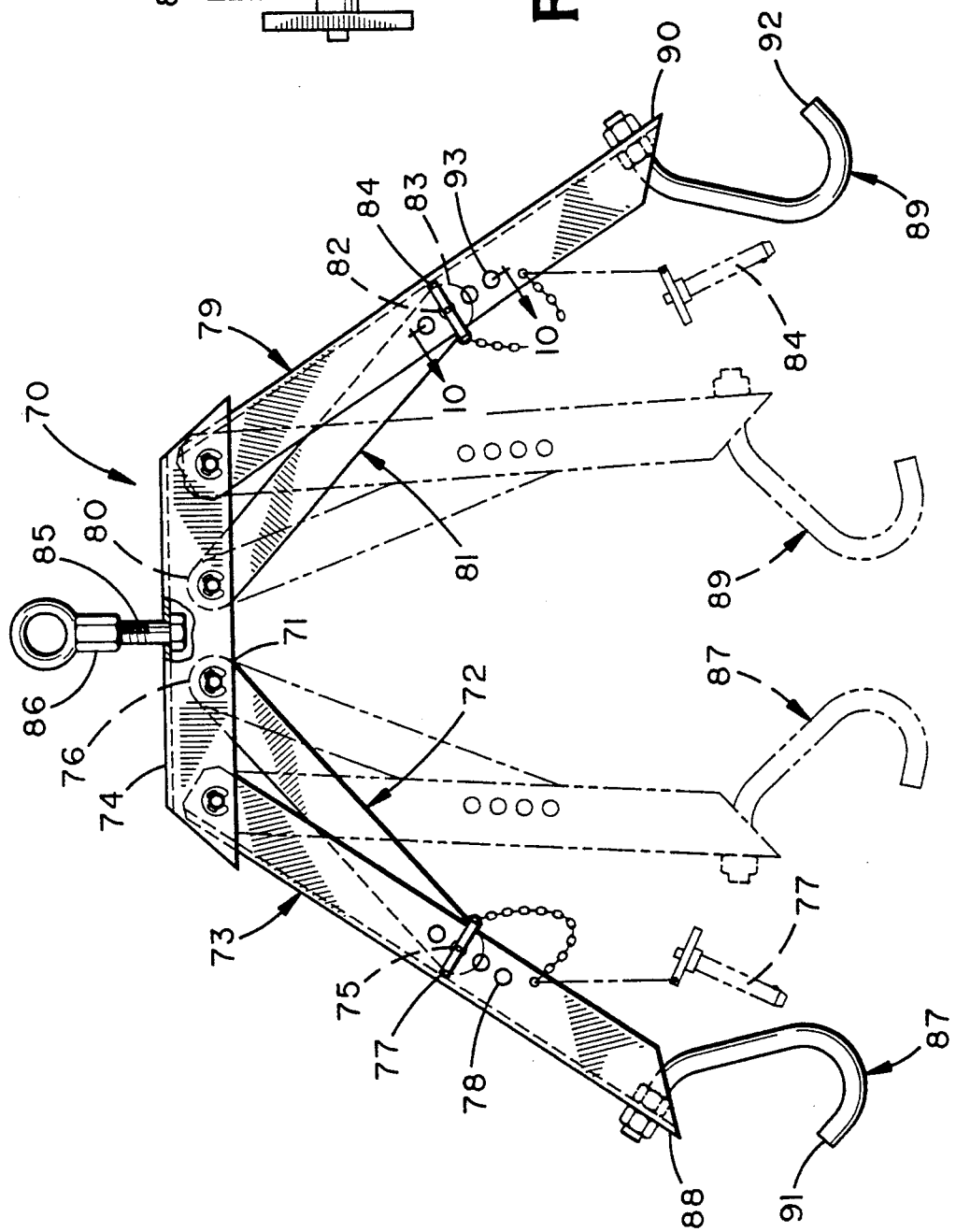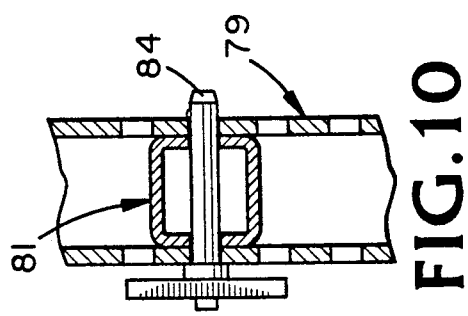

SELF-SPREADING GAMBREL FOR SUPPORTING SLAIN ANIMALS

BACKGROUND OF THE INVENTION

1. Field of the Invention

This invention relates to a portable, collapsible and self-adjustable game supporting device to assist a hunter to skin and dress a slain animal especially in the field where often the animal needs to be butchered immediately in order to preserve the meat and hide.

2. Description of the Related Art

Once an animal such as a deer is killed, the carcass needs to be skinned and butchered in order to preserve the meat. In the past, hunters have addressed this problem in various ways. Skinning and butchering an animal on the ground offers many opportunities to damage the hide or to contaminate the meat. So the hunter has continuously strived to raise the carcass of the ground.

U.S. Pat. No. 3,894,313 to W. A. Miller on Jul. 15, 1975 for a Game Hanger describes a frame, having removable interlocking pieces, for supporting a slaughtered animal having a block and tackle connected to a triangular hanger having hooks on opposing ends to place through the legs of the animal.

U.S. Pat. No. 4,580,317 to R. G. Timothy on Apr. 8, 1986 for a Portable Hanger for Deer and Other Animal Carcasses and Methods shows a device having two cantilevered rigid support arms pivotally joined and having hooks on one end of each arm to hook into the body of the animal.

U.S. Pat. No. 4,860,404 to B. E. Flachs on Aug. 29, 1989 for a Portable Deer Pole describes a triangular support structure having a winch and a block and tackle to winch one or more animal carcasses off of the ground.

U.S. Pat. No. 5,049,110 to J. M. Owens on Sep. 17, 1991 for a Portable Game Support describes a frame that is attached to a tree. The slain animal is hooked onto a hanger. A block and tackle attached to the hanger and the frame. The animal is then raised off of the ground.

Today's hunter still finds himself beset with problems not solved by previous game support devices. The present invention addresses these problems. One problem facing multi-game hunters is that in most cases different size game require a gambrel designed for that size game. It is difficult to suspend a Wild Boar from a gambrel designed to suspend an Elk. Earlier game supports or gambrels required addition optional equipment to adapt or required the user to buy another gambrel. The present gambrel is self-adjusting. It will function as a support for skinning and butchering large or small game in the field, at the lodge or back at home. And it is collapsible which makes it easily transported back in remote places. Many of the early devices were so bulky that the game had to be drug out to the support defeating the whole purpose of the field support device.

SUMMARY OF THE INVENTION

In the first alternative embodiment (shown in FIGS. 7 and 8), the apparatus 40 for supporting slain animals 100 has a suspension member 41. One end 42 of a first linking member 43 is pivotally connected to the suspension member 41. There is a first side frame member 44 pivotally connected to the suspension member 41. another end 45 of the first linking member 43 is selectingly and lockingly connected in at least one locking notch 46 in a locking channel 47 in the first side frame member 44. There is a second side frame member 48 pivotally connected to the suspension member 41. One end 49 of a second linking member 50 pivotally connects to the suspension member 41 and another end 51 of the second linking member 50 selectingly and lockingly connects in at least one locking notch 52 in a locking channel 53 in the second side frame member 48. A hanger 54 adjustably connects to the suspension member 41 and there is an adjustment means 55 that adjusts by using threaded connector 56 on the hanger 55. There are at least one first support means 57 adjustably connected to an end 58 of the first side frame member 44 and at least one second support means 59 adjustably connected to one end 60 of the second side frame member 48 to attach a slain animal 100. In FIG. 8, a cross-section of second linking member 50 (the first linking member is a mirror image of the second linking member) is shown within the cross-section of the second side frame member 48. A locking pin 61 is shown resting in locking notch 52 of locking channel 53.

In a second alternative embodiment, another apparatus 70 for supporting slain animals 100 is shown and described. One end 71 of a first linking member 72 and a first side frame member 73 pivotally connects to the suspension member 74.

In this embodiment, there is at least one pin port 75 in the first linking member 72 and the other end 76 of the first linking member 72 is connected, by a locking pin 77 selectingly and removably placed through the pin port 75 and through at least one locking port 78 in the first side frame member 73, to the first side frame member 73. There is also a second side frame member 79. One end 80 of a second linking member 81 pivotally connects to the suspension member 74. There is at least one pin port 82 in the second linking member 81 and the other end 83 of the second linking member 81 connects, by a locking pin 84 selectingly and removably placed through the pin port 82 and through at least one locking port 93 in the second side frame member 79, to the second side frame member 79. A hanger 85 is adjustably connected to the suspension member 74 and there is an adjustment means 86 (threadingly connected or by equivalent means) on the hanger 85.

There are at least one first support means 87 adjustably connected to an end 88 of the first side frame member 73 and at least one second support means 89 (such as a hook as shown or the equivalent) adjustably connected to one end 90 of the second side frame member 79 to attach a slain animal 100.

The attachment to the animal 100 is usually by inserting the support means 87 and 89 through a line 101 tied around the hind legs 102 of the animal 100 as shown in FIGS. 5 and 6 or the supports could have a sharpened hook or the equivalent on one end 91 and 92 which could be inserted through the lower portion of the hind legs of the animal.

It is an object of this invention to provide a gambrel that is easy to transport to the site where the animal is to be skinned and butchered.

It is another object of this invention to provide a gambrel that self adjusts to accommodate varying sizes and weights of animal to be skinned and butchered.

BRIEF DESCRIPTION OF THE DRAWINGS

FIG. 5 is front view of the gambrel showing it used to support a large slain animal.

FIG. 6 is front view of the gambrel showing it used to support a small slain animal.

FIG. 7 is a front view of a first alternative embodiment of the Self-spreading Gambrel for Supporting Slain Animals.

FIG. 8 is a partial cross-section taken along lines 8—8 of FIG. 7 showing the manner in which the other ends of the first and second linking members lock into position in the locking notches of the locking channels of the first and second side frame members.

FIG. 9 is a front view of a second alternative embodiment of the Self-spreading Gambrel for Supporting Slain Animals.

FIG. 10 is a partial cross-section taken along lines 10—10 of FIG. 9 showing the manner in which the other ends of the first and second linking members are connected, by locking pins selectingly and removably placed through the pin ports and through the locking ports in the first and second side frame members, to the first and second side frame members.

DESCRIPTION OF THE PREFERRED EMBODIMENT

Figure 1:
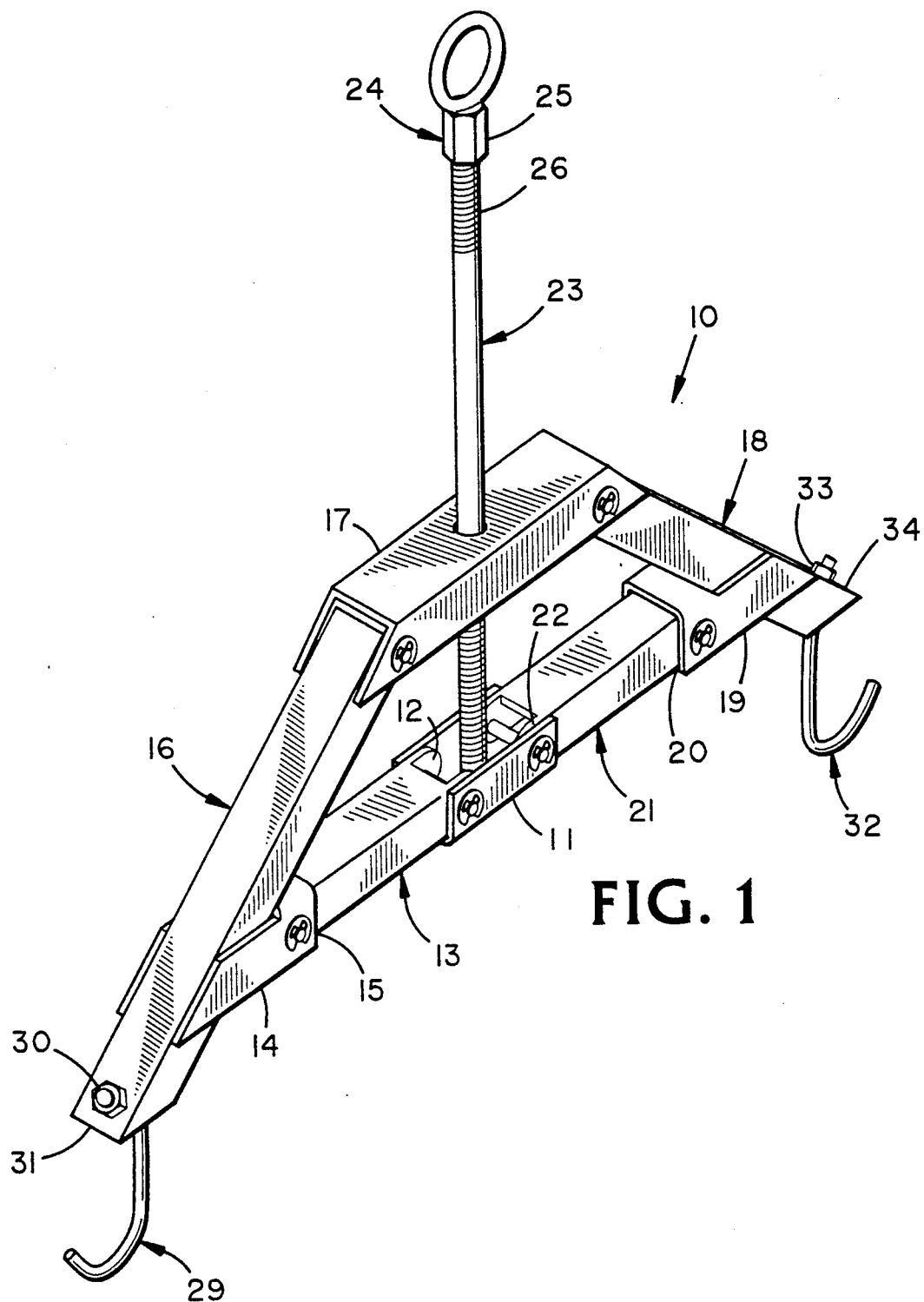
FIG. 1 is a perspective view of the preferred embodiment for a self-spreading Gambrel for Supporting Slain Animals shown in the fully spread position.
Figure 2:
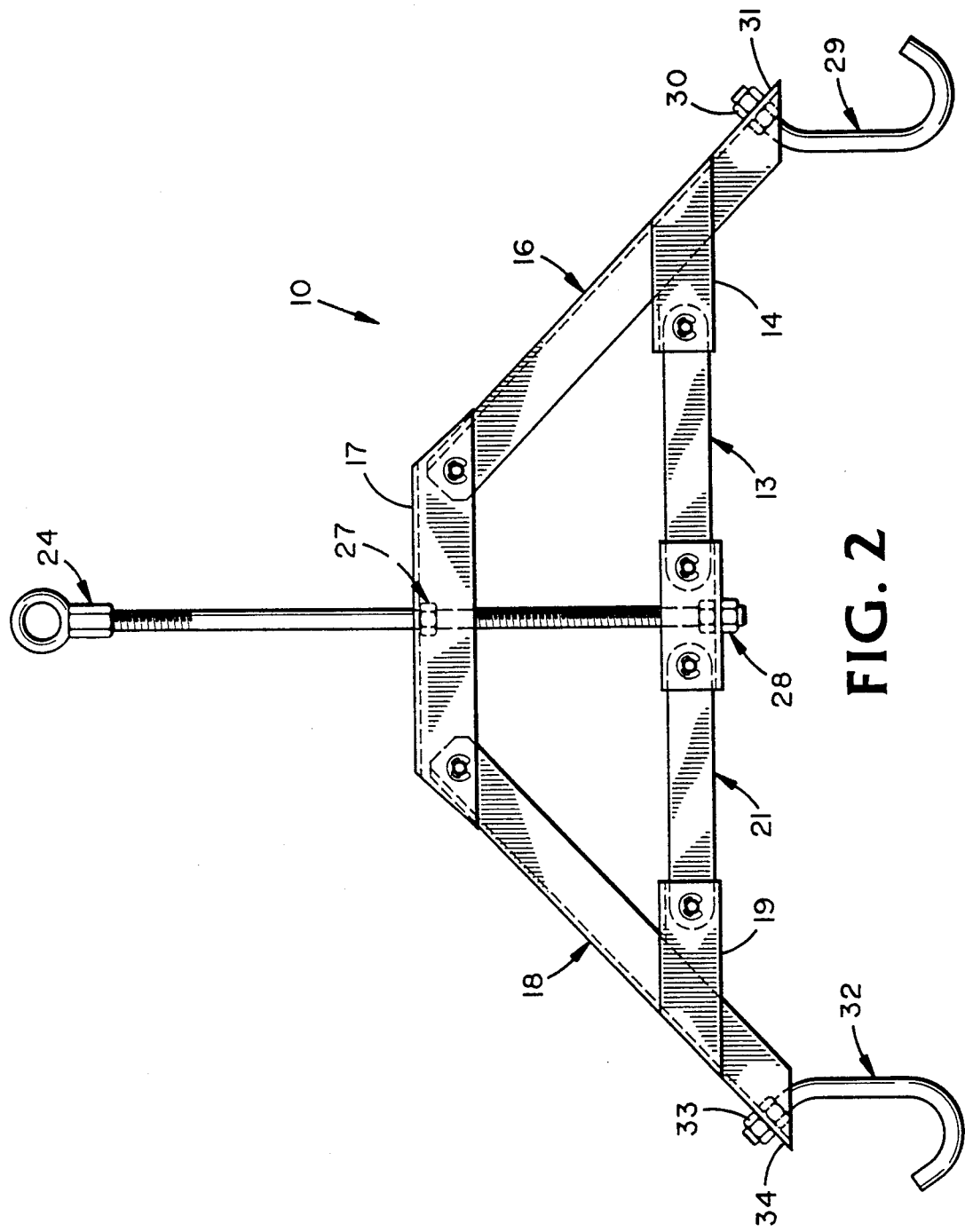
FIG. 2 is front view having hidden lines to better show the relationship of the elements of the gambrel.
Figure 3:
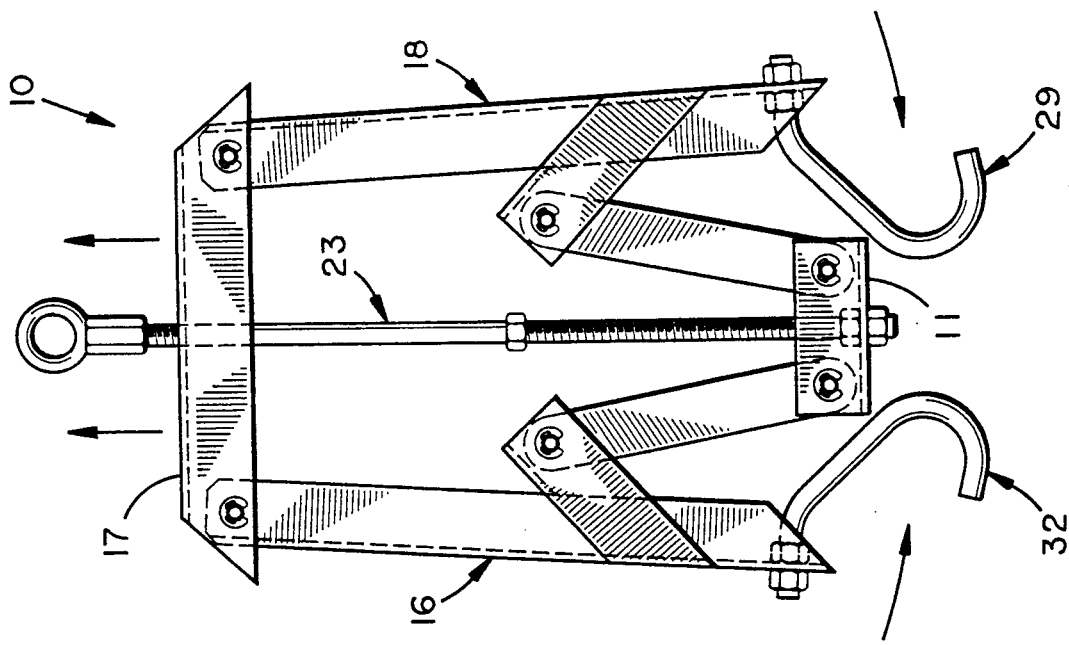
FIG. 3 is a rear view showing the gambrel in the position for supporting small animals or for transporting.
Figure 4:
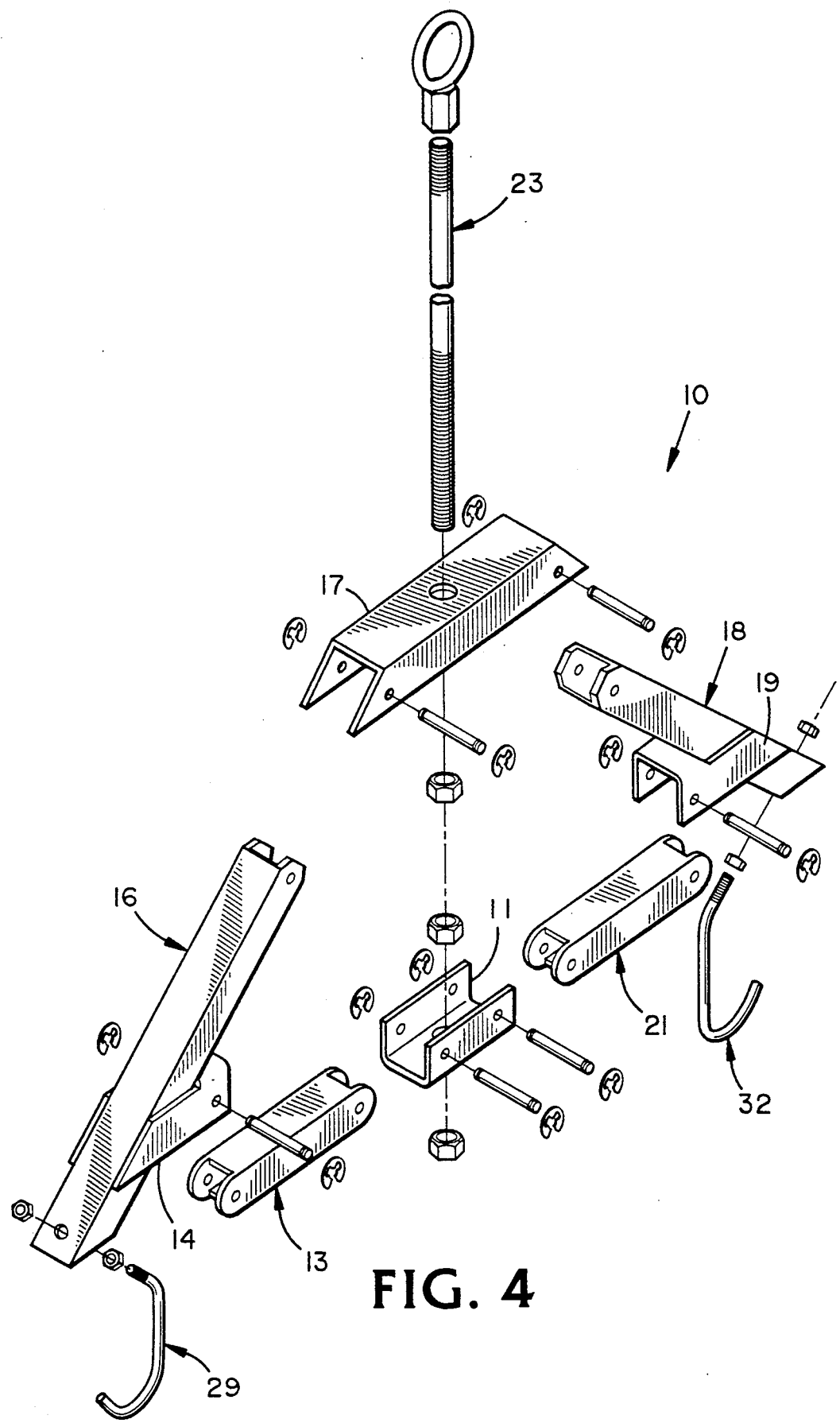
FIG. 4 is an exploded view of the preferred embodiment.

Referring to FIGS. 1 through 6, an apparatus 10 for supporting slain animals 100 is shown. There is an adjustable frame member 11 having one end 12 of a first linking member 13 pivotally connected to the adjustable frame member 11.

A first abutting member 14 is pivotally connected to another end 15 of the first linking member 13 and a first side frame member 16 is attached to the first abutting member 14. There is a suspension member 17 pivotally connected to the first side frame member 16 and a second side frame member 18 pivotally connected to the suspension member 17. A second abutting member 19 attaches to the second side frame member 18 and one end 20 of a second linking member 21 pivotally connects to the second abutting member 19.

Another end 22 of the second linking member 21 pivotally connects to the adjustable frame member 11. There is a hanger 23 adjustably connected to the adjustable frame member 11 and there is a first adjustment means 24, such as a threaded nut 25 and threads 26 on the hanger 23 or the equivalent, on the hanger 23. There is a second adjustment means 27 and a third adjustment means 28, similar to the first adjustment means 24, on the hanger 23. At least one first support means 29 is adjustably connected, by threaded nuts 30 or the equivalent, to an end 31 of the first side frame member 16 and at least one second support means 32 is adjustably connected, by threaded nuts 33 or the equivalent, to one end 34 of the second side frame member 18 to attach a slain animal 100.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An apparatus for supporting slain animals comprising:
   (a) a suspension member;
   (b) one end of a first linking member pivotally connected to the suspension member;
   (c) a first side frame member pivotally connected to the suspension member;
   (d) another end of the first linking member selectingly and lockingly connected in at least one locking notch in a locking channel in the first side frame member;
   (e) a second side frame member pivotally connected to the suspension member;
   (f) one end of a second linking member pivotally connected to the suspension member;
   (g) another end of the second linking member selectingly and lockingly connected in at least one locking notch in a locking channel in the second side frame member;
   (h) a hanger adjustably connected to the suspension member;
   (i) an adjustment means on the hanger;
   (j) at least one first support means adjustably connected to an end of the first side frame member to attach the slain animal; and
   (k) at least one second support means adjustably connected to one end of the second side frame member to attach the slain animal.

2. An apparatus as described in claim 1 wherein the first linking member further comprises a locking pin selectively and lockingly connected in the locking notch of the locking channel in the first side frame member.

3. An apparatus as described in claim 1 wherein the second linking member further comprises a locking pin selectively and lockingly connected in the locking notch of the locking channel in the second side frame member.

4. An apparatus for supporting slain animals comprising:
   (a) a suspension member;
   (b) one end of a first linking member pivotally connected to the suspension member;
   (c) a first side frame member pivotally connected to the suspension member;
   (d) at least one pin port in the first linking member;
   (e) another end of the first linking member connected, by a locking pin selectingly and removably placed through the pin port and through at least one locking port in the first side frame member, to the first side frame member;
   (f) a second side frame member pivotally connected to the suspension member;
   (g) one end of a second linking member pivotally connected to the suspension member;
   (h) at least one pin port in the second linking member;
   (i) another end of the second linking member connected, by a locking pin selectingly and removably placed through the pin port and through at least one locking port in the second side frame, to the second side frame member;

(j) a hanger adjustably connected to the suspension member;
(k) an adjustment means on the hanger;
(l) at least one first support means adjustably connected to an end of the first side frame member to attach the slain animal; and
(m) at least one second support means adjustably connected to one end of the second side frame member to attach the slain animal.

* * * * *